(12) United States Patent
Girard et al.

(10) Patent No.: US 11,847,856 B2
(45) Date of Patent: Dec. 19, 2023

(54) METHOD FOR MATCHING AN IMAGE OF A PALM OF AN INDIVIDUAL WITH AT LEAST ONE IMAGE FROM A PLURALITY OF REFERENCE PALM IMAGES

(71) Applicant: IDEMIA IDENTITY & SECURITY FRANCE, Courbevoie (FR)

(72) Inventors: Fantin Girard, Courbevoie (FR); Emilie Niaf, Courbevoie (FR); Guy Mabyalaht, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 0 days.

(21) Appl. No.: 18/157,480

(22) Filed: Jan. 20, 2023

(65) Prior Publication Data

US 2023/0237833 A1  Jul. 27, 2023

(30) Foreign Application Priority Data

Jan. 21, 2022 (FR) ..................... 22 00504

(51) Int. Cl.
*G06V 40/12* (2022.01)
*G06V 40/13* (2022.01)
(Continued)

(52) U.S. Cl.
CPC .......... *G06V 40/1371* (2022.01); *G06V 10/82* (2022.01); *G06V 40/1318* (2022.01); *G06V 40/50* (2022.01)

(58) Field of Classification Search
CPC ............... G06V 40/1371; G06V 10/82; G06V 40/1318; G06V 40/50; G06V 40/12; G06F 21/32
See application file for complete search history.

(56) References Cited

U.S. PATENT DOCUMENTS

| 8,064,645 B1 | 11/2011 | Sezille |
| 2012/0189169 A1 | 7/2012 | Sezille |
| (Continued) | | |

FOREIGN PATENT DOCUMENTS

| CN | 110427826 A | 11/2019 |
| EP | 2 479 705 A1 | 7/2012 |

OTHER PUBLICATIONS

French Preliminary Search Report and Written Opinion dated Aug. 24, 2022 in French Application 22 00504 filed on Jan. 21, 2022, 9 pages.

(Continued)

*Primary Examiner* — Abhishek Sarma
(74) *Attorney, Agent, or Firm* — Oblon, McClelland, Maier & Neustadt, L.L.P.

(57) ABSTRACT

A method for matching an image of a palm of an individual with at least one image from a plurality of reference palm images, which includes: creation of a reference base from the plurality of reference palm images comprising, for each reference palm image, a selection of at least one reference palm region and a coding into a reference regional biometric information item, determination of an individual palmary biometric information item from the image of the palm of the individual comprising a selection of at least one individual palm region and the coding thereof into individual regional biometric information item, for each image, comparison of each individual regional biometric information item with each reference regional biometric information item, and matching of the image of the palm of the individual with at least one image from the plurality of reference palm images, as a function of a result of the comparison.

9 Claims, 4 Drawing Sheets

(51) Int. Cl.
*G06V 10/82* (2022.01)
*G06V 40/50* (2022.01)

(56) References Cited

U.S. PATENT DOCUMENTS

2013/0243267 A1 9/2013 Sezille
2019/0392189 A1 12/2019 Kumar et al.

OTHER PUBLICATIONS

Mirmohamadsadeghi et al., "Palm Vein Recognition with Local Texture Patterns", The Institution of Engineering and Technology, IET Biom., vol. 3, Iss. 4, 2014, 9 pages.

METHOD FOR MATCHING AN IMAGE OF A PALM OF AN INDIVIDUAL WITH AT LEAST ONE IMAGE FROM A PLURALITY OF REFERENCE PALM IMAGES

CROSS-REFERENCE TO RELATED APPLICATION

The present application claims priority to French Patent Application No. 22 00504, filed on Jan. 21, 2022. The entire content of the foregoing is incorporated herein by reference.

The invention relates to the field of biometric recognition, in particular the recognition of the palm of a hand, by the matching of an image of the palm of an individual with one or more images in a reference base.

Analytical palm-of-the-hand recognition methods are known from the prior art. These analytical methods are based on a matching of points of minute detail. The results of the analytical methods are not always satisfactory. It is desirable to propose another efficient method capable of consolidating an analytical method to augment the palm-of-the-hand recognition performance levels.

It is known practice to use neural networks in the biometric recognition methods to enhance the recognition performance levels. However, application to an entire palm of the hand as is known for doing so for the fingers of a hand cannot be commercialized because the processing time would be too great, the surface of a palm of a hand being much greater than the surface of the fingers of a hand. Thus, palm-of-the-hand recognition methods that use neural networks, comprising a step of extraction from a palm image of an area of interest, generally centred on said palm, are known from the prior art. Extracting an area of interest from a palm of a hand makes it possible to reduce the processing time. However, such a targeted extraction is possible only if the palm in the image is an entire palm. When the palm in the image is partial, it is difficult, even impossible, to identify the centre of the palm and therefore extract the area of interest. Thus, the methods from the prior art using neural networks are not suited to the recognition of a partial palm.

The invention aims to resolve the abovementioned problems of the prior art by proposing a method that allows for a matching of an image of a palm of an individual with at least one image from a plurality of reference palm images that is reliable and efficient, whether the image of the palm of the individual is complete or partial.

The invention relates to a method for matching an image of a palm of an individual with at least one image from a plurality of reference palm images using a computer and a biometric encoder, the matching method comprising the following steps:

a step of creation of a reference base from the plurality of reference palm images comprising, for each reference palm image, a step of selection by the computer of at least one palm region of a predefined size applied to the reference palm, called reference palm region, and, for each reference palm region, a step of coding into a reference regional biometric information item by the biometric coder, the reference base comprising the set of the reference regional biometric information items of the plurality of reference palm images, a step of determination of an individual palmary biometric information item from the image of the palm of the individual comprising the step of selection by the computer of at least one palm region applied to the palm of the individual, called individual palm region, and, for each individual palm region, the step of coding into an individual regional biometric information item by the biometric coder, the set of the individual regional biometric information items forming the individual palmary biometric information item, for each reference palm image, a step of comparison by the computer of each individual regional biometric information item with each reference regional biometric information item, a step of matching, by the computer, of the image of the palm of the individual with at least one image from the plurality of reference palm images, as a function of a result of the comparison.

According to one aspect of the invention, the step of selection of at least one palm region comprises a sub step of selection by the computer of at least one characteristic point of the palm and a sub step of extraction by the computer of at least one palm region of the predefined size comprising said at least characteristic point.

According to one aspect of the invention, a palm region is referenced with respect to at least one characteristic point.

According to one aspect of the invention, a palm region is referenced with respect to a characteristic point or with respect to a barycentre of a plurality of characteristic points if the characteristic points of the plurality of characteristic points are situated with respect to one another according to a predefined geographic proximity.

According to one aspect of the invention, a characteristic point is chosen from among:

a point of minute detail,
a point of maximum curvature of a palmary pattern,
a point of maximum gradient of a palmary pattern.

According to one aspect of the invention, a palm region is of rectangular form and the predefined size is such that each side of the rectangle has a dimension lying between an eighth and a twelfth of a side of a rectangular envelope of an entire palm tangential to said palm.

According to one aspect of the invention, the coding step comprises the use of a neural network, a regional biometric information item comprising a vector obtained from said neural network.

According to one aspect of the invention, the comparison step comprises, for each reference palm image, a computation comprising, for each associated reference regional biometric information item, a determination of a regional score of similarity with each individual regional biometric information item and a determination of a palmary similarity score as a function of the regional similarity scores, the step of matching of the image of the palm of the individual being a function of the palmary similarity scores associated with the reference palm images.

According to one aspect of the invention, the computation of a palmary similarity score comprises a sum of a predefined number of the best regional similarity scores.

According to one aspect of the invention, the image of the palm of the individual comprises a complete or partial palm, the matching step comprising, in the case of a complete palm, a selection of the reference image associated with the highest palmary similarity score, and, in the case of a partial palm, a selection of a predetermined number of reference images having the highest palmary similarity scores.

The invention relates also to a computer program product comprising the program instructions implementing the steps of the matching method, when the program instructions are executed by a computer.

Other advantages and features of the invention will emerge on reading the description and the drawings.

Figure 1A:
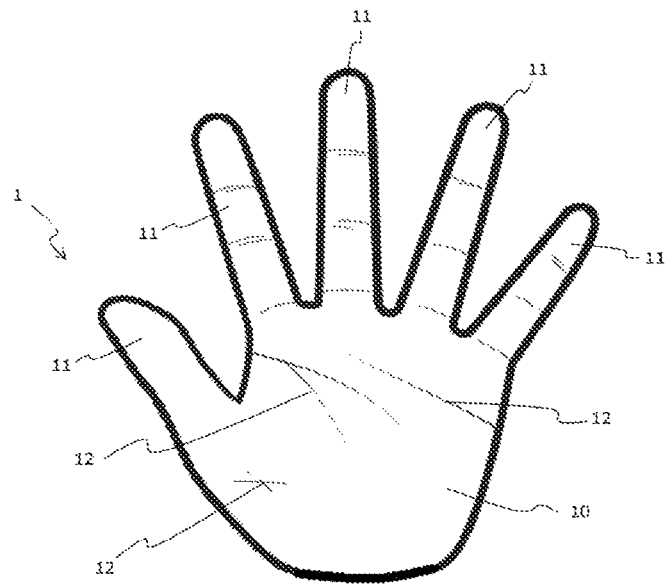
FIG. 1a represents a hand.

FIG. 1a illustrates a hand 1 of a person. The hand 1 comprises a palm 10 and five fingers 11.

The palm 10 comprises palmary patterns 12 formed by ridges and troughs in the form of loops, arcs, lines which may or may not cross.

Figure 1B:
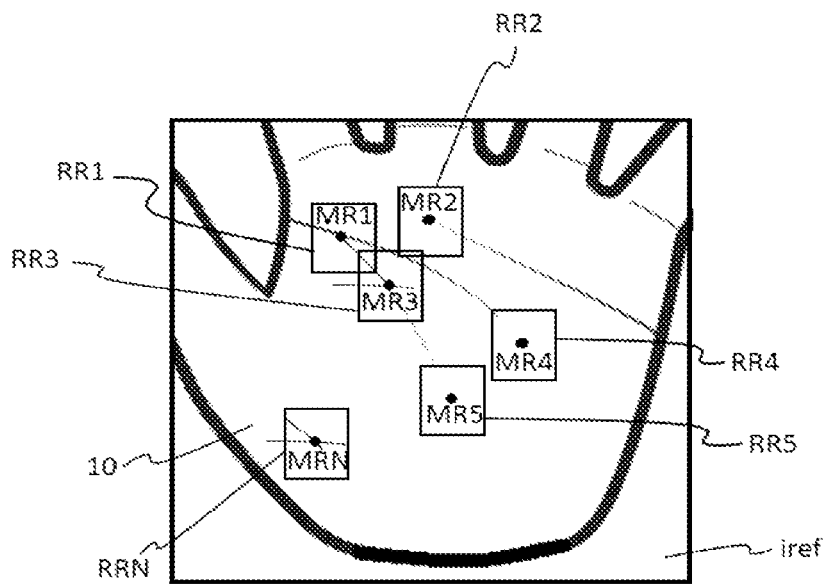
FIG. 1b represents a reference palm image.

FIG. 1b represents a reference palm image iref comprising the palm 10 of the hand 1 of FIG. 1a.

A reference palm image iref is an image of good quality comprising an entire palm 10 of a hand. A reference palm image iref is intended for the creation of a reference base.

The reference palm image iref shows six reference palm regions RR1, RR2, RR3, RR4, RR5, RRN, each centred on a corresponding characteristic point MR1, MR2, MR3, MR4, MR5, MRN.

A reference palm region RR1, RR2, RR3, RR4, RR5, RRN is a smaller region than the reference palm, around the size of an end phalange of a finger which, like a finger end phalange image, can be processed in a reasonable time to extract a biometric information item therefrom.

Figure 2:
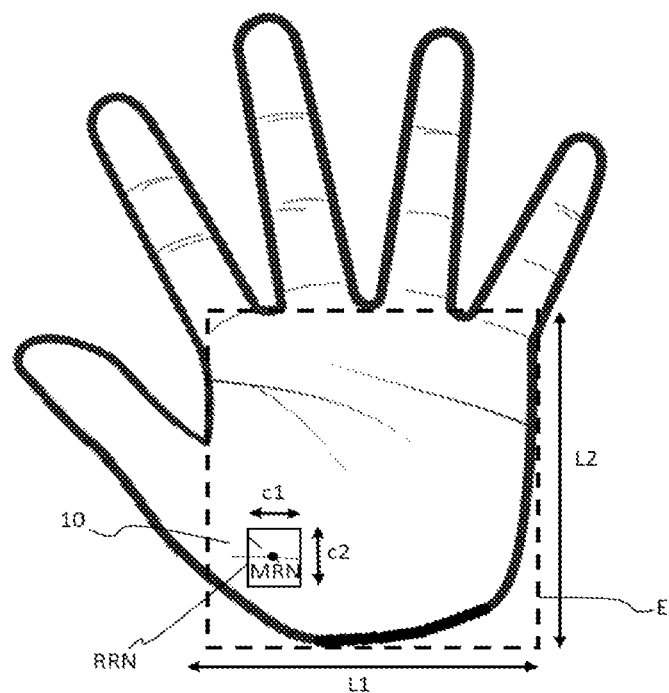
FIG. 2 illustrates a palm region in an entire palm.

As illustrated in FIG. 2, a reference palm region RRN is advantageously of rectangular form and of predefined size.

To define the predefined size of a reference palm region RR1-RRN, an envelope E of the entire palm 10 is first of all defined. The envelope E is a rectangle. The palm 10 is inscribed within said envelope E. The envelope E is circumscribed on the palm 10. The limits of the palm 10 are tangential to the envelope E. The envelope E is defined by a small side L1 and a large side L2. An envelope E is an encompassing box.

A reference palm region RR1-RRN is rectangular and comprises a first side c1 and a second side c2. For example, the predefined size of a reference palm region RR1-RRN and such that:
the first side c1 of a reference palm region RR1-RRN has a dimension lying between an eighth and a twelfth of the small side L1 of the envelope E,
the second side c2 of a reference palm region RR1-RRN has a dimension lying between an eighth and a twelfth of the large side L2 of the envelope E.

For example, the predefined side of a rectangular reference palm region RR1-RRN is such that each side c1, c2 has a dimension lying between an eighth and a twelfth of a side L1, L2 of a rectangular envelope of an entire palm.

For example, a reference palm region RR1-RRN is a square whose side dimension lies between an eighth and a twelfth of the large side L2 of a rectangular envelope of an entire palm.

The order of magnitude of a palm region RR1-RRN is that of an end phalange of a finger.

Since the size of a reference palm region RR1-RRN is predefined, the dimensions of a rectangular envelope of an entire palm of an adult hand of average size will be taken for the determination of the reference palm region RR1-RRN size.

For example, for an adult hand of average size, the dimensions of an envelope E are defined by:
a small side of 1700 pixels dimension,
a large side of 1900 pixels dimension.

According to this example, a square reference palm region RR1-RRN of 256-pixel side is chosen, for example.

In order to guarantee that a biometric information item can be extracted therefrom and as represented in FIGS. 1b and 2, a reference palm region RR1, RR2, RR3, RR4, RR5, RRN contains at least one characteristic point MR1, MR2, MR3, MR4, MR5, MRN.

A characteristic point MR1-MRN is a palmary pattern point 12 and is chosen from among:
a point of minute detail,
a point of maximum curvature of a palmary pattern,
a point of maximum gradient of a palmary pattern.

A point of minute detail is, in a palmary pattern, a local singular point, a point of irregularity, such as a bifurcation, a termination, an island, a lake.

A point of maximum curvature is a palmary pattern point whose curvature is maximal within an area of, for example, 50×50 pixels. A point of maximum gradient is a palmary pattern point whose gradient is maximal in an area of, for example, 50×50 pixels. The gradient is characterized by an average value of the pixels of a region of predetermined size.

Figure 3:
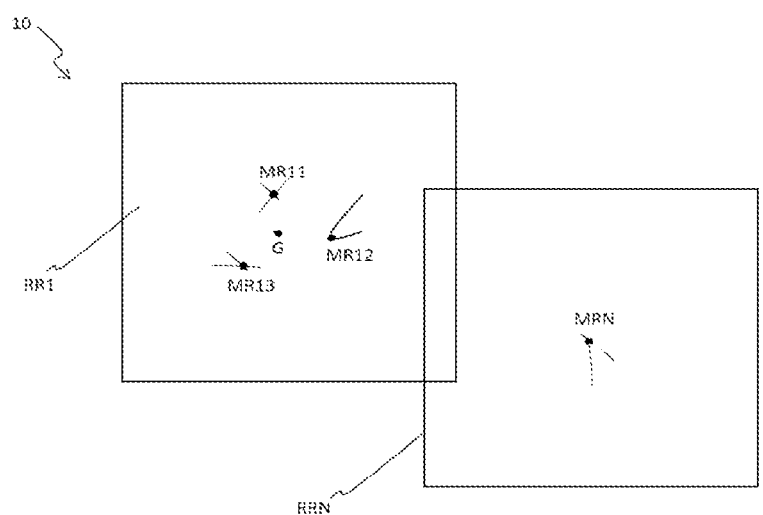
FIG. 3 represents the selection of a palm region with respect to characteristic points of the palm.

FIG. 3 also illustrates a particular case of a reference palm image i comprising a reference palm region RR1 referenced with respect to a plurality of characteristic points MR11, MR12, MR13, in particular with respect to a barycentre G of said plurality of characteristic points MR11, MR12, MR13.

Indeed, the characteristic points of the plurality of characteristic points MR11, MR12, MR13 are situated with respect to one another according to a predefined geographic proximity.

Referencing a palm region RR1 with respect to the barycentre G of said plurality of characteristic points MR11, MR12, MR13 avoids having too many overlapping palm regions, the biometric information item extracted on areas of overlap being redundant for the associated reference palm regions.

The predefined geographic proximity corresponds, for example, to a maximum distance between the characteristic points of the plurality of characteristic points MR11, MR12, MR13 that is less than 100 pixels.

A reference palm region RRN referenced with respect to a single characteristic point MRN is also illustrated in FIG. 3.

Based on the position of the characteristic points MR1-MRN, M11, M12, M13, some portions of reference palm regions may overlap, as illustrated in FIG. 1b and FIG. 3. The referencing of reference palm regions with respect to a barycentre in the case of a plurality of characteristic points MR11, MR12, MR13 situated with respect to one another according to a predefined geographic proximity makes it possible to limit the overlaps.

Advantageously, a reference palm region RRN is centred with respect to a characteristic point MRN or with respect to the barycentre G of a plurality of characteristic points MR11, MR12, MR13.

Figure 4:
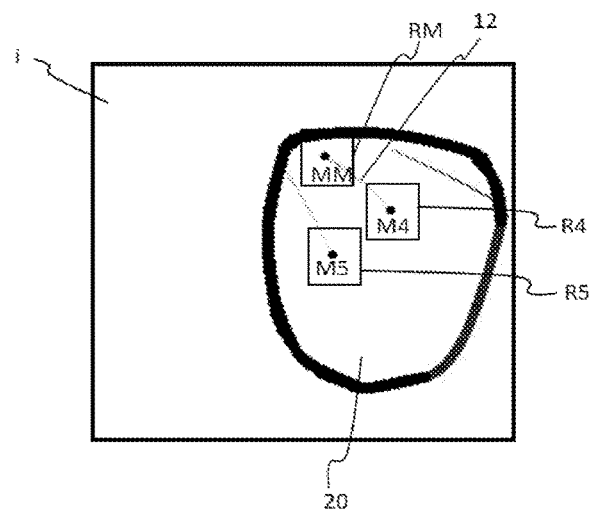
FIG. 4 represents an image of a partial palm of an individual.

FIG. 4 represents an image of a palm of an individual i to be identified.

As represented in FIG. 4, an image of a palm of an individual i can be partial. It is for example an image of a print palm found on a crime scene.

Such an image of a palm of an individual i can be entire. It is for example a palm image obtained from a deliberate biometric capture.

On the image of a partial palm of an individual i of FIG. 4, three individual palm regions R4, R5, RM are represented, each centred on a corresponding characteristic point M4, M5, MM.

The palm regions and the characteristic points for an image of a palm of an individual i are determined in the same way for a reference palm image iref. Everything described previously concerning the palm regions and the characteristic points for the reference palm image iref applies equally to the image of a palm of an individual i.

Thus, a characteristic point on an individual palm image i has the same characteristics and is determined in the same way as a characteristic point on a reference palm image iref.

A reference palm region has the same characteristics and is determined in the same way as an individual palm region. For example, the size of a reference palm region is predetermined and is the same as the size of an individual palm region.

In the particular case of FIG. 4, the palm 20 is a partial palm of the palm 10 of the hand 1 of FIG. 1a. Thus, the reference palm image iref and the individual palm image i are images of the same palm of the hand 1.

Thus, the characteristic points M4, M5 of FIG. 4 correspond to the characteristic points MR4, MR5 of FIG. 1b, since they are determined in the same way as in FIG. 1b. The other characteristic points MR1, MR2, MR3, MRN belong to a part of a palm of a hand 1 not visible on the individual palm image i and do not therefore have any match on the partial palm 20.

A characteristic point MM is identified on the individual palm image i of FIG. 4 although it is not identified on the reference palm image iref of FIG. 1b. This is explained for example by the fact that a palmary pattern termination 12 is detected on the individual palm image i of FIG. 4 because of the truncation of the palm 20 in the individual palm image i.

Figure 5:
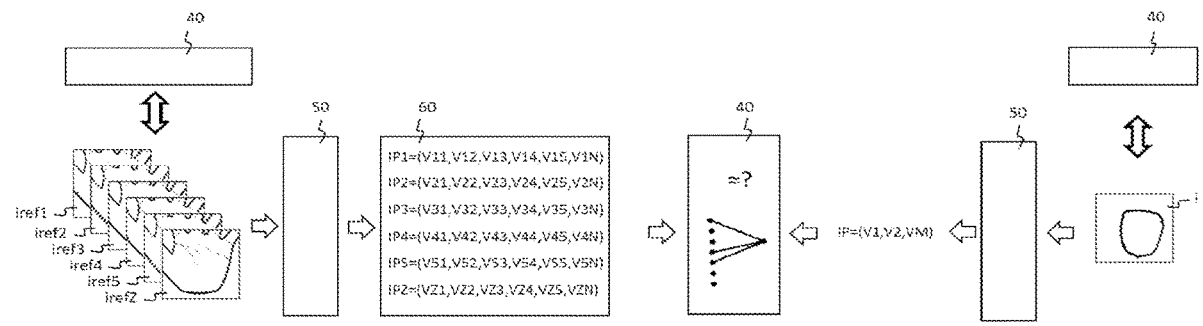
FIG. 5 illustrates a system comprising a reference palmary biometric information base and a palmary biometric information item of an individual, for the matching thereof.

FIG. 5 illustrates a system comprising:
a computer 40,
a plurality of reference palm images iref1-irefZ,
an individual palm image i,
a biometric coder 50 capable of extracting reference palmary biometric information items IP1-IPZ from the plurality of reference palm images iref1-irefZ, and capable of extracting an individual palmary biometric information item IP from the individual palm image i,
a reference base 60 comprising reference palmary biometric information IP1-IPZ extracted from the plurality of reference palm images iref1-irefZ,
an individual palmary biometric information item IP extract from the individual palm image i.

The left side of FIG. 5 shows the computer 40, the plurality of reference palm images iref1-irefZ, the biometric coder 50 and the reference base 60.

The right side of FIG. 5 shows the computer 40, the individual palm image i, the biometric coder 50 and the individual palmary biometric information item IP.

The computer 40 and the biometric coder 50 are represented several times in FIG. 5 to assist the legibility of the illustration.

The reference base 60 comprises the reference palmary biometric information items IP1-IPZ associated with the plurality of reference palm images iref1-irefZ.

Each reference palmary biometric information item IP1-IPZ is associated with a reference palm image iref1-irefZ.

Each reference palm image iref1-irefZ comprises at least one reference palm region RR1-RRN referenced with respect to at least one characteristic point MR1-MRN, as previously described in relation to FIGS. 1b, 2 and 3.

Each reference palmary biometric information item IP1-IPZ comprises a set of reference regional biometric information items V11-V1N, VZ1-VZN. Each reference regional biometric information item V11-V1N, VZ1-VZN is extracted by the biometric coder 50 from a palm region RR1-RRN of the corresponding reference palm image iref1-irefZ.

Similarly, the individual palmary biometric information item IP is associated with an individual palm image i.

The individual palm image i comprises at least one individual palm region R1-RM referenced with respect to at least one characteristic point M1-MM, as previously described in relation to FIG. 4 and by analogy reference to FIGS. 1b, 2 and 3.

The individual palmary biometric information item IP comprises a set of individual regional biometric information items V1-VM. Each individual regional biometric information item V1-VM has been extracted by the biometric coder 50 from a palm region R1-RM of the corresponding individual palm image i.

As illustrated at the centre of FIG. 5, the computer 40 is capable of comparing each individual regional biometric information item V1-VM associated with the individual palm image i with each reference regional biometric information item V11-V1N, VZ1-VZN associated with each reference palm image iref1-irefZ.

Based on this comparison, the computer 40 is capable of matching the image of the palm of the individual i with at least one image of the plurality of reference palm images iref1-irefZ.

Advantageously, the biometric coder 50 comprises a neural network. A reference regional biometric information item V11-V1N, VZ1-VZN or individual regional biometric information item V1-VM comprises a vector obtained from said neural network, for example a size vector 128. Thus, a reference biometric information item IP1-IPZ is a set of reference regional biometric information vectors V11-V1N, VZ1-VZN. Likewise, an individual biometric information item IP is a set of individual regional biometric information vectors V1-VM.

For example, the neural network is of DenseNet or ResNet type.

According to an alternative, the biometric coder 50 comprises an analytical algorithm.

It should be noted that the computer 40 and the biometric coder 50 can be grouped together in one control unit or be distinct devices.

Figure 6A:
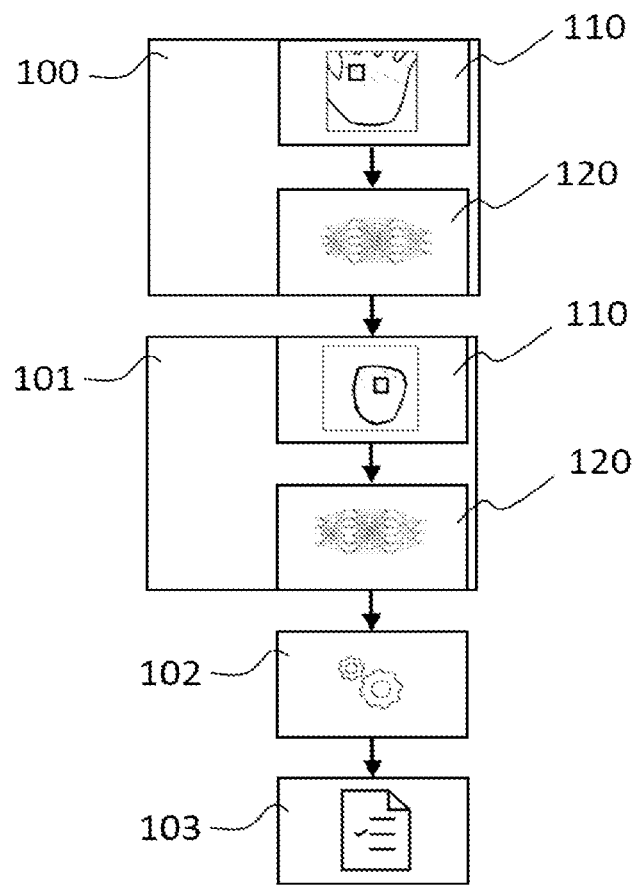
FIG. 6a illustrates the steps of the method according to the invention.

FIG. 6a illustrates the steps of the method for matching an image of a palm of an individual i with at least one image from a plurality of reference palm images iref1-irefZ, according to the invention and in relation to the system described in FIG. 5.

The matching method according to the invention comprises a step of creation 100 of a reference base 60, the computer 40 having available a plurality of reference palm images iref1-irefZ.

Advantageously, the plurality of reference palm images iref1-irefZ comprise between 10 000 and 100 000 reference palm images iref1-irefZ.

The creation step 100 comprises a selection step 110 and a coding step 120, applied to reference palms 10 in the plurality of reference palm images iref1-irefZ.

According to the selection step 110, the computer 40 selects, for each reference palm image iref1-irefZ, at least one reference palm region RR1-RRN, for example as described previously, in relation to FIGS. 1b, 2 and 3.

Figure 6B:
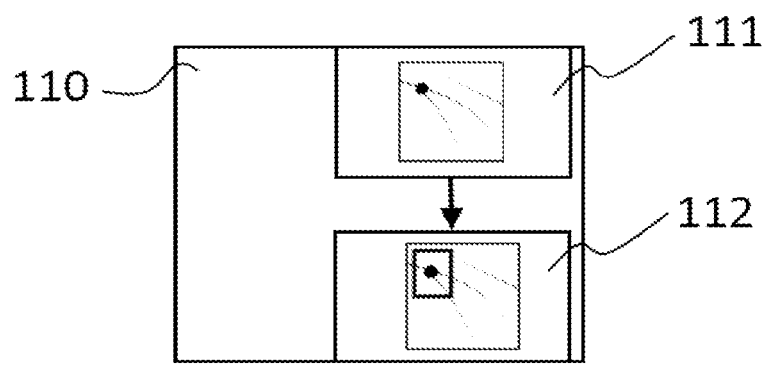
FIG. 6b illustrates the sub steps of one of the steps of the method according to the invention.

For example, as represented in FIG. 6b, the selection step 110 comprises, for each reference palm image iref1-irefZ:
- a selection sub step 111 in which the computer 40 selects at least one characteristic point MR1-MRN of the palm in the reference image iref1-irefZ,
- and an extraction sub step 112 in which the computer 40 extracts at least one palm region RR1-RRN of predefined size comprising said at least one characteristic point MR1-MRN.

A reference palm image iref1-irefZ advantageously comprises a complete palm 10 of a hand 1. On such a reference palm image iref1-irefZ and according to the method of FIG. 6b, the computer selects on average between 4 and 15 reference palm regions RR1-RRN.

A complete reference palm comprises between 100 and 300 characteristic points MR1-MRN.

According to the coding step 120, the biometric coder 50 extracts, from each reference palm region RR1-RRN, a reference regional biometric information item V11-V1N, VZ1-VZN.

The set of the reference regional biometric information items V11-V1N, VZ1-VZN associated with a reference palm image iref1-irefZ forms a reference palmary biometric information item IP1-IPZ.

The computer 40 creates the reference base 60 by assembling the reference palmary biometric information items IP1-IPZ of the plurality of reference palm images iref1-irefZ.

The matching method according to the invention also comprises a step of determination 101 of an individual palmary biometric information item IP, the computer 40 having a palm image of an individual i.

The determination step 101 comprises the selection step 110 and the coding step 120, already mentioned previously, but this time applied to the individual palm 20 of the individual palm image i.

According to the selection step 110, the computer 40 selects at least one individual palm region R1-RM, for example as described previously, in relation to FIG. 4 and by analogy reference to FIGS. 1b, 2 and 3.

For example, as represented in FIG. 6b, the selection step 110 comprises, for the individual palm image i:
- a selection sub step 111 in which the computer 40 selects at least one characteristic point M1-MM of the palm in the individual palm image i,
- and an extraction sub step 112 in which the computer 40 extracts at least one palm region RR1-RRN of predefined size comprising said at least one characteristic point MR1-MRN.

The palm image of an individual i can comprise a complete or partial palm 20 of a hand 1 of the individual.

In the case of a partial palm, the selection of at least one individual palm region R1-RM is possible according to the method of FIG. 6b only if the computer detects at least one characteristic point M1-MM.

According to the selection step 120, the biometric coder 50 extracts, from each individual palm region R1-RM, an individual regional biometric information item V1-VM.

The set of the individual regional biometric information items V1-VM forms the individual palmary biometric information item IP.

The matching method according to the invention also comprises a comparison step 102, in which the computer 40 compares each individual regional biometric information item V1-VM with each reference regional biometric information item V11-V1N, VZ1-VZN of each reference palm image iref1-irefZ.

The comparison step 102 comprises, advantageously for each reference palm image iref1-irefZ, a computation comprising:
- for each reference regional biometric information item V11-V1N, VZ1-VZN, a determination of a regional score of similarity with each individual regional biometric information item V1-VM,
- and a determination of a palmary similarity score as a function of said regional similarity scores.

In the case where the biometric coder 50 comprises a neural network and the reference regional biometric information items V11-V1N, VZ1-VZN and individual regional biometric information items V1-VM are vectors, the similarity score is obtained from the result of a computation of cosine similarity between two vectors, determined by the scalar product of the vectors divided by the product of their norms.

Advantageously, the computation of palmary similarity score comprises a sum of a predefined number of the best regional similarity scores.

For example, the palmary similarity score computation is the sum of a predefined number of the best regional similarity scores.

For example, the palmary similarity score computation is an average of a predefined number of the best regional similarity scores.

For example, the palmary similarity score computation is the weighted sum of a predefined number of the best regional similarity scores, the weighting being a function of the quality of the corresponding reference and individual palm images, on the palm regions concerned.

The predefined number advantageously lies between five and fifteen, for example ten.

A very simplified example is described below to illustrate a computation performed by the computer 40, supported by FIG. 5.

The individual palm image comprises two reference regions from which the biometric coder 50 extracts two individual regional biometric information items V1, V2.

A first reference palm image iref1 comprises four reference regions from which the biometric coder 50 extracts four reference regional biometric information items V11, V12, V13, V14.

The computer 40 computes, for the first reference palm image ref1, the following regional similarity scores:
- a regional similarity score S111 associated with the reference regional biometric information item V11 and with the individual regional biometric information item V1,
- a regional similarity score S112 associated with the reference regional biometric information item V12 and with the individual regional biometric information item V1,
- a regional similarity score S113 associated with the reference regional biometric information item V13 and with the individual regional biometric information item V1,
- a regional similarity score S114 associated with the reference regional biometric information item V14 and with the individual regional biometric information item V1, a regional similarity score S121 associated with the reference regional biometric information item V11 and with the individual regional biometric information item V2, a regional similarity score S122 associated with the reference regional biometric information item V12 and with the individual regional biometric information item V2, a regional similarity score S123 associated with the reference regional biometric information item V13 and with the individual regional biometric information item V2, a regional similarity score S124 associated with the reference regional biometric information item V14 and with the individual regional biometric information item V2.

The computer 40 computes, for the first reference palm image ref1, a first palmary similarity score S100 equal to a sum of a predefined number of the best regional similarity scores associated with said first reference palm image ref1, the predefined number being the figure five for our example.

If, in descending order of value, the regional similarity scores are ranked as follows: S111>S112>S113>S114>S121>S122>S123>S124, then the first palmary similarity score S100 is computed as follows:

$$S100=S111+S112+S113+S114+S121.$$

A second reference palm image iref2 comprises four reference regions from which the biometric coder 50 extracts four reference regional biometric information items V21, V22, V23, V24.

The computer 40 computes, for the second reference palm image ref2, the following regional similarity scores:

a regional similarity score S211 associated with the reference regional biometric information item V21 and with the individual regional biometric information item V1, a regional similarity score S212 associated with the reference regional biometric information item V22 and with the individual regional biometric information item V1, a regional similarity score S213 associated with the reference regional biometric information item V23 and with the individual regional biometric information item V1, a regional similarity score S214 associated with the reference regional biometric information item V24 and with the individual regional biometric information item V1, a regional similarity score S221 associated with the reference regional biometric information item V21 and with the individual regional biometric information item V2, a regional similarity score S222 associated with the reference regional biometric information item V22 and with the individual regional biometric information item V2, a regional similarity score S223 associated with the reference regional biometric information item V23 and with the individual regional biometric information item V2, a regional similarity score S224 associated with the reference regional biometric information item V24 and with the individual regional biometric information item V2.

The computer 40 computes, for the second reference palm image ref2, a second palmary similarity score S200 equal to the sum of the five best regional similarity scores associated with said second reference palm image ref2.

If, in descending order of value, the regional similarity scores are ranked as follows: S224>S223>S222>S221>S214>S213>S212>S211, then the second palmary similarity score S200 is computed as follows:

$$S200=S224+S223+S222+S221+S214.$$

A third reference palm image iref3 comprises five reference regions from which the biometric coder 50 extracts five reference regional biometric information items V31, V32, V33, V34, V35.

The computer 40 computes, for the third reference palm image ref3, the following regional similarity scores:

a regional similarity score S311 associated with the reference regional biometric information item V21 and with the individual regional biometric information item V1, a regional similarity score S312 associated with the reference regional biometric information item V22 and with the individual regional biometric information item V1, a regional similarity score S313 associated with the reference regional biometric information item V23 and with the individual regional biometric information item V1, a regional similarity score S314 associated with the reference regional biometric information item V24 and with the individual regional biometric information item V1, a regional similarity score S315 associated with the reference regional biometric information item V25 and with the individual regional biometric information item V1, a regional similarity score S321 associated with the reference regional biometric information item V21 and with the individual regional biometric information item V2, a regional similarity score S322 associated with the reference regional biometric information item V22 and with the individual regional biometric information item V2, a regional similarity score S323 associated with the reference regional biometric information item V23 and with the individual regional biometric information item V2, a regional similarity score S324 associated with the reference regional biometric information item V24 and with the individual regional biometric information item V2, a regional similarity score S325 associated with the reference regional biometric information item V25 and with the individual regional biometric information item V2.

The computer 40 computes, for the third reference palm image ref3, a third palmary similarity score S300 equal to the sum of the five best regional similarity scores associated with said third reference palm image ref3.

If, in descending order of value, the regional similarity scores are ranked as follows: S325>S324>323>S322>S321>S315>S314>313>S312>S311, then the third palmary similarity score S300 is computed as follows:

$$S300=S325+S324+S323+S322+S321.$$

According to this example, it is specified that, according to a descending order of value, the palmary similarity scores are ranked as follows: S300>S200>S100.

The matching method according to the invention also comprises a matching step 103 in which the computer 40 matches the image of the palm of the individual i with at least one image from the plurality of reference palm images iref1-irefZ, based on a result of the comparison.

In particular, the matching step 103 of the image of the palm of the individual i is a function of the palmary similarity scores of the reference palmary biometric information items V11-V1N, VZ1-VZN associated with the reference palm images iref1-irefZ.

Two cases are distinguished:
first case: the image of the palm of the individual i comprises a complete palm,
first case: the image of the palm of the individual i comprises a partial palm.

In the case where of a complete palm, the computer 40 selects a reference palm image iref1-irefZ associated with the highest palmary similarity score according to the matching step 103.

According to the above very simplified example, the highest palmary similarity score is the third palmary similarity score S300. The computer 40 selects the third reference image iref3.

In the case where of a partial palm, the computer 40 selects a predetermined number of reference images iref1-irefZ having the highest palmary similarity scores.

The predetermined number is advantageously between 10 and 150, for example 100.

From the above simplified example, let the same principle be applied for a number of reference palm images iref1-irefZ equal to 10 000. The computer 40 then computes 10 000 palmary similarity scores associated with the 10 000 reference palm images iref1-irefZ.

For a predetermined number equal to 10, if the 10 palmary similarity scores are those associated with the reference images iref1, iref2, iref3, iref4, iref5, iref6, iref7, iref8, iref9, iref10, then the computer 40 selects the reference images iref1, iref2, iref3, iref4, iref5, iref6, iref7, iref8, iref9, iref10 according to the matching step 103.

The method of the invention makes it possible to reliably and stably match an image of a palm of an individual i with one or more reference palm images, even in the case where the individual palm image i contains a partial palm.

The invention claimed is:

1. A method for matching an image of a palm of an individual with at least one image from a plurality of reference palm images using a computer and a biometric encoder, the matching method comprising:
creating a reference base from the plurality of reference palm images comprising, for each reference palm image, a step of selection by the computer of at least one palm region of a predefined size applied to the reference palm, called reference palm region, and, for each reference palm region, a step of coding into a reference regional biometric information item by the biometric coder, the reference base comprising the set of the reference regional biometric information items of the plurality of reference palm images;
determining an individual palmary biometric information item from the image of the palm of the individual including selecting by the computer of at least one palm region applied to the palm of the individual, called individual palm region, and, for each individual palm region, coding into an individual regional biometric information item by the biometric coder the set of the individual regional biometric information items forming the individual palmary biometric information item;
for each reference palm image, comparing the computer of each individual regional biometric information item with each reference regional biometric information item; and
matching by the computer of the image of the palm of the individual with at least one image from the plurality of reference palm images, as a function of a result of the comparison,
wherein the selecting of at least one palm region further comprises
selecting by the computer of at least one characteristic point of the palm and
extracting by the computer of at least one palm region of the predefined size comprising said at least characteristic point, the palm region being referenced with respect to said at least one characteristic point.

2. The matching method according to claim 1, wherein a palm region is referenced with respect to a characteristic point or with respect to a barycentre of a plurality of characteristic points if the characteristic points of the plurality of characteristic points are situated with respect to one another according to a predefined geographic proximity.

3. The matching method according to either one of claim 1, wherein a characteristic point is chosen from among:
a point of minute detail,
a point of maximum curvature of a palmary pattern, and
a point of maximum gradient of a palmary pattern.

4. The matching method according to claim 1, wherein a palm region is of rectangular form and the predefined size is such that each side of the rectangle has a dimension lying between an eighth and a twelfth of a side of a rectangular envelope of an entire palm tangential to said palm.

5. The matching method according to claim 1, wherein the coding further comprises using a neural network and
wherein a regional biometric information item includes a vector obtained from said neural network.

6. The matching method according to claim 1, wherein the comparison further comprises, for each reference palm image, a computation including, for each associated reference regional biometric information item, a determination of a regional score of similarity with each individual regional biometric information item and a determination of a palmary similarity score as a function of the regional similarity scores, and
wherein the matching of the image of the palm of the individual is a function of the palmary similarity scores associated with the reference palm images.

7. The matching method according to claim 6, wherein the computation of a palmary similarity score further comprising a sum of a predefined number of the best regional similarity scores.

8. The matching method according to claim 6, wherein the image of the palm of the individual including a complete or partial palm, and
wherein the matching further comprising, in the case of a complete palm, a selection of the reference image associated with the highest palmary similarity score, and, in the case of a partial palm, a selection of a predetermined number of reference images having the highest palmary similarity scores.

9. A non-transitory computer program product comprising the program instructions that when executed by a computer cause the computer to implement the matching method according to claim 1.

* * * * *